United States Patent
Cho

(10) Patent No.: US 7,986,221 B2
(45) Date of Patent: Jul. 26, 2011

(54) INFORMATION PROCESSING APPARATUS, INFORMATION PROCESSING APPARATUS SYSTEM AND CONTROL METHOD OF INFORMATION PROCESSING APPARATUS

(75) Inventor: Eun-seop Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1134 days.

(21) Appl. No.: 11/585,160

(22) Filed: Oct. 24, 2006

(65) Prior Publication Data

US 2007/0094025 A1    Apr. 26, 2007

(30) Foreign Application Priority Data

Oct. 24, 2005    (KR) .................. 10-2005-0100454

(51) Int. Cl.
*G08B 1/00* (2006.01)
(52) U.S. Cl. ................ 340/309.16; 340/309.7; 368/244; 368/10; 348/346
(58) Field of Classification Search .............. 340/309.16, 340/309.4, 309.7; 368/244, 10; 348/346
See application file for complete search history.

(56) References Cited

U.S. PATENT DOCUMENTS

| 6,714,136 B1 * | 3/2004 | Auyang et al. ........... 340/825.24 |
| 6,940,395 B2 * | 9/2005 | Steinmark ................ 340/309.16 |
| 7,130,616 B2 * | 10/2006 | Janik ......................... 455/412.1 |
| 7,457,204 B1 * | 11/2008 | Winters ......................... 368/73 |
| 2002/0068558 A1 * | 6/2002 | Janik ............................. 455/422 |
| 2003/0001727 A1 * | 1/2003 | Steinmark ................ 340/309.15 |
| 2003/0121059 A1 | 6/2003 | Ramaswamy |
| 2004/0160337 A1 * | 8/2004 | Auyang et al. ........... 340/825.24 |
| 2005/0094036 A1 * | 5/2005 | Tichelaar ...................... 348/730 |
| 2005/0105374 A1 | 5/2005 | Finke-Anlauff et al. |
| 2009/0085762 A1 * | 4/2009 | Yuki et al. .................. 340/691.6 |

FOREIGN PATENT DOCUMENTS

| CN | 1605192 A | 4/2005 |
| CN | 1641617 A | 7/2005 |
| JP | 2002-359670 A | 12/2002 |
| JP | 2005-065153 A | 3/2005 |
| KR | 1998-0077098 A | 11/1998 |

* cited by examiner

*Primary Examiner* — Travis R Hunnings
(74) *Attorney, Agent, or Firm* — Sughrue Mion, PLLC

(57) ABSTRACT

An information processing apparatus, an information processing apparatus system and a control method of an information processing apparatus are provided. The information processing apparatus includes a network unit which receives user recognition information having time data from an external device; and a processor which outputs a user recognition signal corresponding to the time data if a current time reaches a time corresponding to the time data.

12 Claims, 3 Drawing Sheets

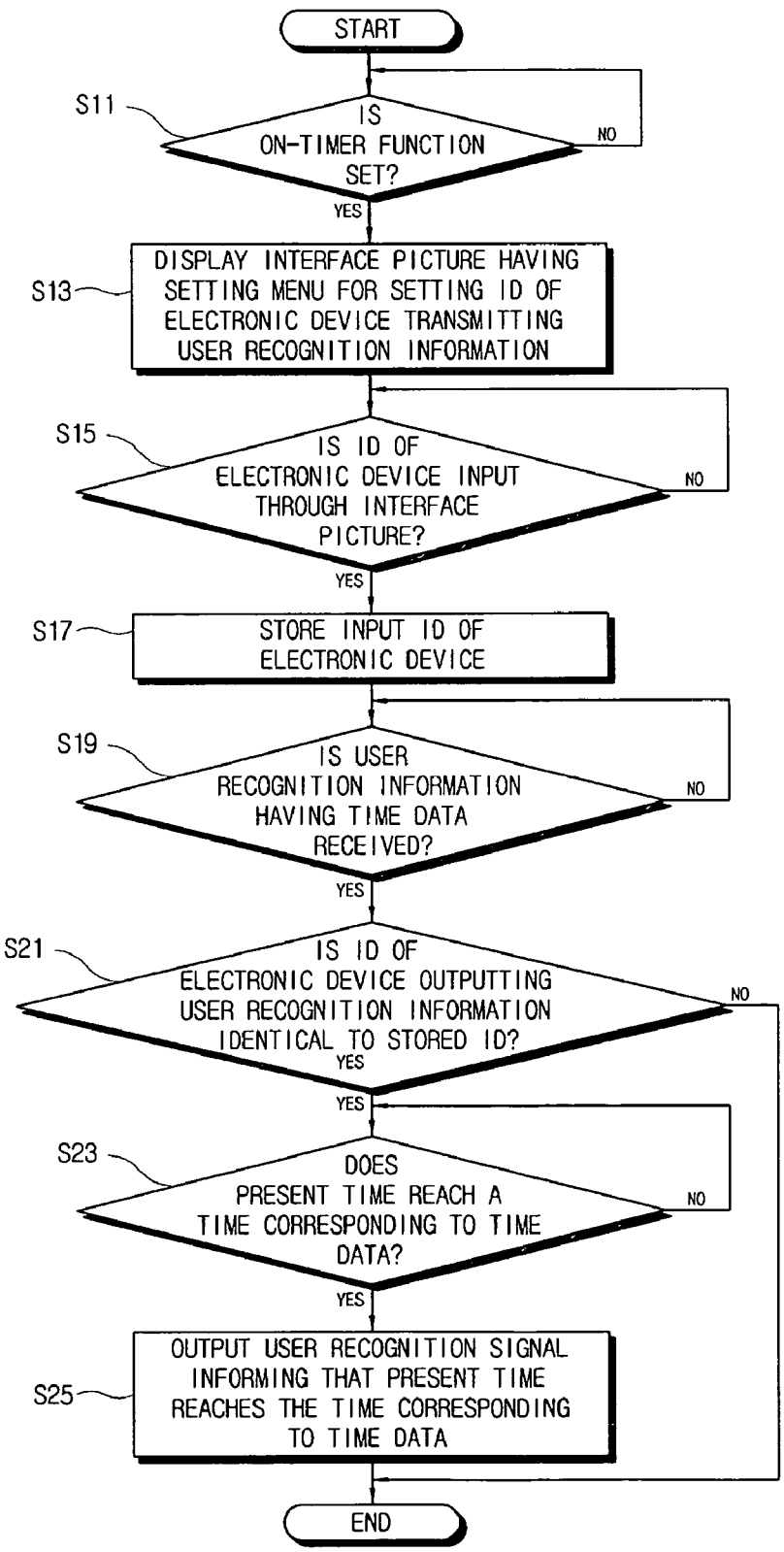

ion processing apparatus, an information processing apparatus system and a control method of an information processing apparatus, and more particularly, to an information processing apparatus capable of outputting user recognition signal, an information processing apparatus system and a control method of an information processing apparatus.

INFORMATION PROCESSING APPARATUS, INFORMATION PROCESSING APPARATUS SYSTEM AND CONTROL METHOD OF INFORMATION PROCESSING APPARATUS

CROSS-REFERENCE TO RELATED APPLICATIONS

This application claims priority from Korean Patent Application No. 2005-0100454, filed on Oct. 24, 2005, in the Korean Intellectual Property Office, the disclosure of which is incorporated herein by reference.

BACKGROUND OF THE INVENTION

1. Field of the Invention

The present invention relates to an information processing apparatus, an information processing apparatus system and a control method of an information processing apparatus, and more particularly, to an information processing apparatus capable of outputting user recognition signal, an information processing apparatus system and a control method of an information processing apparatus.

2. Description of the Related Art

Generally, a display apparatus, that is an information processing apparatus, such as a TV receives viewing signals including a video signal and an audio signal from a broadcasting source like a broadcasting station, to display an image based on the viewing signals on a display unit and to output a sound to a speaker based on the viewing signals.

Recently, a home network system has been widely used. In the home network system, electronic appliances such as a television (TV), a mobile phone and an electronic clock exchange information through a home network.

In a related art information processing apparatus system, data information which is exchanged based on the home network system is limited. For example, when the electronic appliances, such as a mobile phone and an electronic clock, store user's schedule information and wake-up call information therein, the electronic appliances do not exchange or share the foregoing information.

SUMMARY OF THE INVENTION

The present invention provides an information processing apparatus which outputs user recognition signal when an electronic device transmits stored user recognition information to the information processing apparatus, an information processing apparatus system and a control method of an information processing apparatus.

According to an aspect of the present invention, there is provided an information processing apparatus comprising an information processing apparatus network unit which receives user recognition information having time data from a external device; and a processor which outputs a user recognition signal corresponding to the time data if a current time reaches a time corresponding to the time data.

According to another aspect of the present invention, the information processing apparatus further comprises an output unit which outputs a signal based on the user recognition signal; and wherein the output unit comprises at least one of a display which displays an image corresponding to the user recognition signal and a speaker which outputs a sound corresponding to the user recognition signal.

According to another aspect of the present invention, the processor comprises an interface picture generator which generates a interface picture and an information processing apparatus controller which controls the interface picture generator to generate the interface picture comprising information indicating that the current time reaches the time corresponding to the time data when the current time reaches the time corresponding to the time data.

According to another aspect of the present invention, the information processing controller controls the interface picture generator to generate an interface picture having a setting menu to set an identifier (ID) of the external device receiving the user recognition information, and controls the user recognition signal corresponding to the user recognition information received from the external device having the ID set through the setting menu, to be output to the output unit.

According to another aspect of the present invention, the user recognition information comprises at least one of wake-up call information and schedule information having schedule data, and wherein the processor outputs the user recognition signal informing that the current time reaches the time corresponding to the time data when the wake-up call information is received, to the output unit, and outputs the user recognition signal having information that the current time reaches the time corresponding to the time data and the schedule data included in the schedule information to the output unit when the schedule information is received.

According to another aspect of the present invention, the processor outputs the user recognition signal to the output unit at the time corresponding to the time data and at a time before the time corresponding to the time data.

According to an aspect of the present invention, there is provided an information processing apparatus system comprising an electronic device which comprises an electronic device network unit, an electronic device user selection unit which selects user recognition information having time data and an electronic device controller which controls the electronic device network unit to output the selected user recognition information; and an information processing apparatus which comprises an information processing apparatus network unit receiving the user recognition information having the time data from the electronic device and an information processing apparatus processor outputting a user recognition signal to the output unit corresponding to the time data if a current time reaches a time corresponding to the time data.

According to another aspect of the present invention, the system further comprises an output unit which outputs a signal based on the user recognition signal; and wherein the output unit comprises at least one of a display which displays an image corresponding to the user recognition signal and a speaker which outputs a sound corresponding to the user recognition signal.

According to another aspect of the present invention, the information processing apparatus processor comprises an interface picture generator which generates an interface picture and an information processing apparatus controller which controls the interface picture generator to generate the interface picture comprising information indicating that the current time reaches the time corresponding to the time data when the current time reaches the time corresponding to the time data.

According to another aspect of the present invention, the information processing apparatus controller controls the interface picture generator to generate an interface picture having a setting menu to set an ID of the electronic device receiving the user recognition information, and controls the user recognition signal corresponding to the user recognition information received from the external device having the ID set through the setting menu, to be output to the output unit.

According to another aspect of the present invention, the user recognition information comprises at least one of wake-up call information and schedule information having schedule data, and wherein the processor outputs the user recognition signal informing that the current time reaches the time corresponding to the time data when the wake-up call information is received, to the output unit, and outputs the user recognition signal having information that the current time reaches the time corresponding to the time data and the schedule data included in the schedule information to the output unit when the schedule information is received.

According to another aspect of the present invention, the processor outputs the user recognition signal to the output unit at the time corresponding to the time data and at a time before the time corresponding to the time data.

According to another aspect of the present invention, there is provided a method of controlling an information processing apparatus, the method comprising receiving user recognition information having time data from an external device; and outputting a user recognition signal corresponding to the time data if the current time reaches a time corresponding to the time data.

According to another aspect of the present invention, the outputting the user recognition signal comprises at least one of displaying an image corresponding to the user recognition signal and outputting an audio signal corresponding to the user recognition signal.

According to another aspect of the present invention, the outputting the user recognition signal comprises generating an interface picture including information indicating that the current time reaches the time corresponding to the time data, when the current time reaches the time corresponding to the time data; and displaying the interface picture.

According to another aspect of the present invention, the method further comprises generating an interface picture having a setting menu to set an ID of the external device receiving the user recognition information; and storing the ID of the external device which is set through the setting menu.

According to another aspect of the present invention, the outputting the user recognition signal comprises determining the ID of the external device; and outputting the user recognition signal when the ID of the external device is identical to that set through the setting menu.

BRIEF DESCRIPTION OF THE DRAWINGS

The above and/or other aspects of the present invention will become apparent and more readily appreciated from the following description of the exemplary embodiments, taken in conjunction with the accompanying drawings of which:

FIG. 3 is a control flowchart of the information processing apparatus according to an exemplary embodiment of the present invention.

DETAILED DESCRIPTION OF THE EXEMPLARY EMBODIMENT

Figure 1:
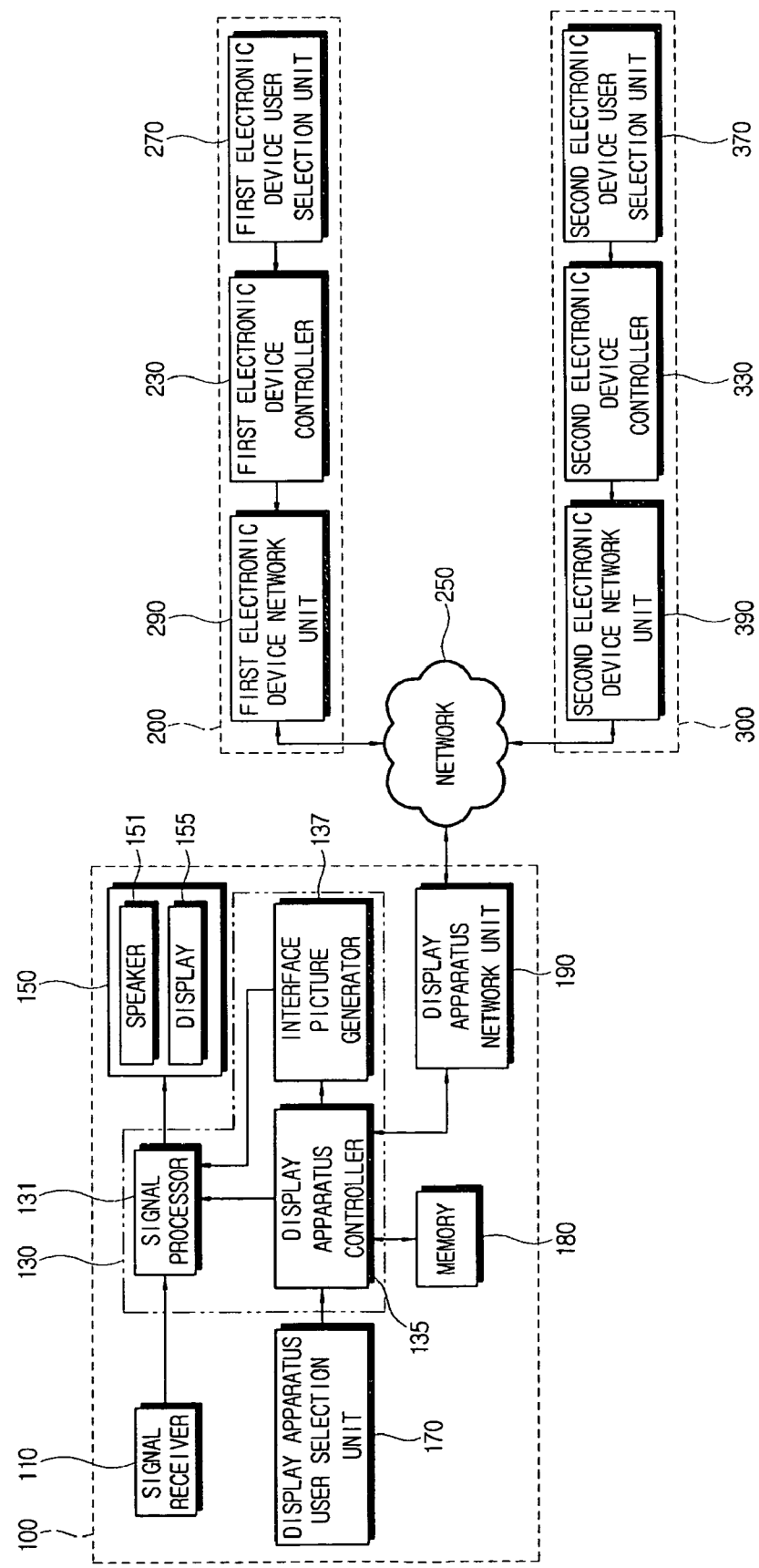
FIG. 1 is a control block diagram of an information processing apparatus system according to an exemplary embodiment the present invention.

Reference will now be made in detail to the exemplary embodiments of the present invention, examples of which are illustrated in the accompanying drawings, wherein like reference numerals refer to like elements throughout.

FIG. 1 is a control block diagram of a display system as an information processing apparatus system according to an exemplary embodiment of the present invention. The display system comprises a display apparatus 100 as an information processing apparatus and at least one electronic device.

Two electronic devices 200 and 300 are shown in the exemplary embodiment of FIG. 1. However, the present not limited thereto, and there may be a single electronic device or more than two electronic device.

The electronic devices 200 and 300 comprise first and second electronic device user selection units 270 and 370 which select user recognition information including time data, first and second electronic device network units 290 and 390, and first and second electronic device controllers 230 and 330 which control the foregoing elements.

Here, the first and second electronic device user selection units 270 and 370 output a key signal to the first and second electronic device controllers 230 and 330 according to a user's control. The first and second electronic device user selection units 270 and 370 input or select a function selected by a user. The first and second electronic device user selection units 270 and 370 may comprise a input key, a button or a remote.

The first and second electronic device network units 290 and 390 comprise a communication module (not shown) and a communication terminal (not shown) through which communication signals are transmitted. The first and second electronic device network units 290 and 390 are connected with a network 250 and communicate with a display apparatus network unit 190 (to be described later) through a method of Blue Tooth, wireless LAN, Ultra Wide Band (UWB) or IrDA.

When user recognition information including time data is selected through the first and second electronic device user selection units 270 and 370, the first and second electronic device controllers 230 and 330 store the user recognition information to an electronic device memory (not shown). Then, the first and second electronic device controllers 230 and 330 control the first and second electronic device network units 290 and 390 to output the user recognition information selected through the first and second electronic device user selection units 270 and 370 to the display apparatus 100 which will be described later.

Here, the user recognition information including the time data may comprise at least one of wake-up call information, schedule information and alarm information.

For example, when each of the electronic devices 200 and 300 is a mobile phone, the electronic device 200 receives 6 a.m. wake-up call information, and the first electronic device controller 230 outputs the 6 a.m. wake-up call information to the display apparatus 100 through the first electronic device network unit 290. When the first or second electronic device 200 or 300 receives schedule information on a 9 a.m. business trip, the first electronic device controller 230 or the second electronic device controller 330 outputs the schedule information on the 9 a.m. business trip to the display apparatus 100 through the first and second electronic device network units 290 and 390.

The display apparatus 100 comprises the display apparatus network unit 190 which receives the user recognition information including the time data from the electronic devices 200 and 300, an output unit 150, and a processor 130 which controls the foregoing elements. The display apparatus 100 may further comprise a signal receiver 110 which receives an input signal, a display apparatus user selection unit 170, and a memory 180.

The output unit 150 outputs a signal which is received from the processor 130. The output unit 150 may comprise at least one of a display 155 which displays an image, and a speaker 151 which outputs a sound.

The signal receiver 110 receives the input signal from an external source. That is, the signal receiver 110 may comprise a terminal which corresponds to various input signal formats to receive various signals. For example, the signal receiver 110 may comprise at least one of a composite input terminal which receives a composite signal, an S-video input terminal which receives an S-video signal, a component input terminal which receives a component signal, a PC input terminal which receives a PC signal and a TV input terminal which receives a TV signal.

The display apparatus user selection unit 170 outputs a key signal to the processor 130 according to a user's selection. The display apparatus user selection unit 170 may comprise a plurality of input keys, a button or a remote to enable a user to input or select a function.

The display apparatus network unit 190 comprises a communication module (not shown) and a communication terminal (not shown) through which communication signals are transmitted. The display apparatus network unit 190 may receive and transmit a communication signal in the same format as that of the first and second electronic device network units 290 and 390. Thus, the display apparatus network unit 190 is connected with the network 250 and communicates with the first and second electronic device network units 290 and 390 using Blue Tooth, a wireless LAN, UWB or IrDA.

When the user recognition information including the time data is supplied to the processor 130 through the display apparatus network unit 190, the processor 130 determines the time data included in the user recognition information and outputs the user recognition signal to the output unit 150 if a current time reaches a time corresponding to the time data. Here, the processor 130 may comprise a signal processor 131 which processes the signal received from the signal receiver 110 to be output to the output unit 150, an interface picture generator 137 which generates an interface picture, and a display apparatus controller 135 which controls respective units of the display apparatus 100.

The signal processor 131 processes the input signal received from the signal receiver 110 to be output by the display 155 and the speaker 151. Here, the signal processor 131 displays an image, respectively corresponding to the input signal, on the display 155 and outputs a sound through the speaker 151 according to a control of the display apparatus controller 135 (to be described later).

The interface picture generator 137 generates the interface picture and outputs it to the signal processor 131. The signal processor 131 combines the input signal and the interface picture to be output to the display 155. Here, the interface picture generator 137 may comprise an OSD signal generator which generates an OSD (on screen display) signal.

The display apparatus controller 135 stores the user recognition information in the memory 180 when it determines that the user recognition information is received through the display apparatus network unit 190. Then, the display apparatus controller 135 determines the time data included in the user recognition information, and controls at least one of the interface picture generator 137 and the signal processor 131 to output the user recognition signal to the output unit 150 if the current time reaches a time corresponding to the time data.

That is, the display apparatus controller 135 controls the interface picture generator 137 to generate the interface picture which includes information indicating that the current time reaches the time corresponding to the time data, when the current time reaches the time corresponding to the time data. Also, the display apparatus controller 135 controls the interface picture generated by the interface picture generator 137 to be output to the signal processor 131. The display apparatus controller 135 controls the signal processor 131 to mix the interface picture and the input signal received through the signal receiver 110 and to output it to the display 155.

Also, the display apparatus controller 135 controls the signal processor 131 to generate an audio signal which includes information indicating that the current time reaches the time corresponding to the time data when the current time reaches the time corresponding to the time data, and to output it to the speaker 151.

The display apparatus controller 135 controls the interface picture generator 137 to generate an interface picture including a setting menu setting an ID of the electronic devices 200 and 300 receiving the user recognition information, and stores the ID of the electronic devices 200 and 300 set through the setting menu, in the memory 180. When the user recognition information is supplied to the display apparatus controller 135 through the signal receiver 110, the display apparatus controller 135 analyzes the ID of the electronic devices 200 and 300 which have output the user recognition information, and compares the analyzed ID with the ID stored in the memory 180. Based on a comparison result, the display apparatus controller 135 stores the user recognition information supplied from the electronic devices 200 and 300 having the ID which is identical to that stored in the memory 180, in the memory 180.

The user recognition information may comprise at least one of the wake-up call information and the schedule information including schedule data. The wake-up call information may comprise the time data. The schedule information may comprise the time data and schedule details, i.e., the schedule data.

When the wake-up call information is supplied, the display apparatus controller 135 may output the user recognition signal comprising information that the current time reaches the time corresponding to the time data, to the output unit 150. When the schedule information is supplied, the display apparatus controller 135 may output the user recognition signal including information that the current time reaches the time corresponding to the time data and the schedule data, to the output unit 150. Here, the display apparatus controller 135 may control at least one of the interface picture generator 137 and the signal processor 131 to output the user recognition signal to the output unit 150 at a time before the time corresponding to the time data included in the user recognition information.

Figure 2:
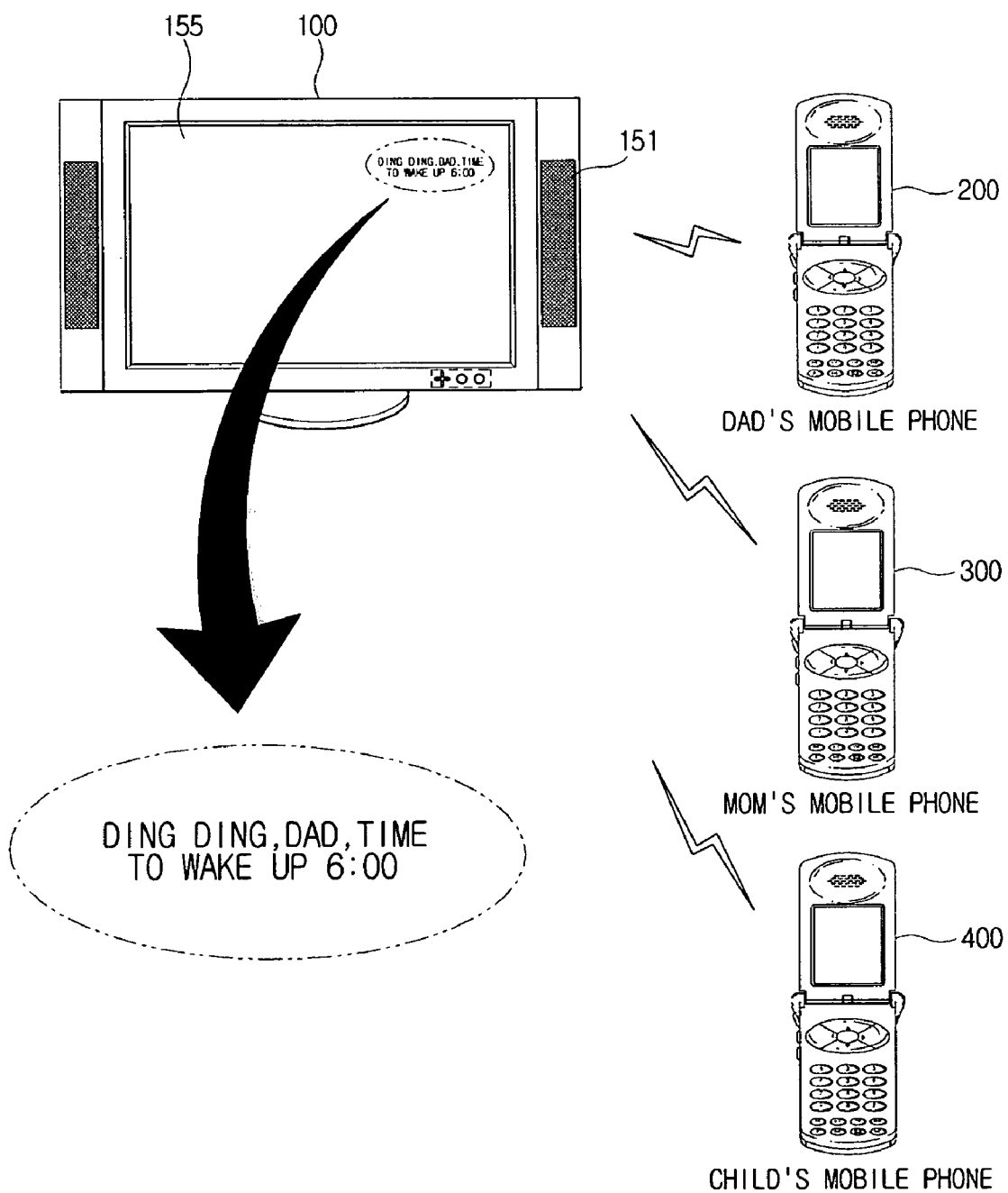
FIG. 2 illustrates an image corresponding to a user recognition signal which is displayed on a display unit of an information processing apparatus according to an exemplary embodiment of the present invention.

As shown in FIG. 2, the electronic devices comprise three mobile phones including a dad's mobile phone 200, a mom's mobile phone 300 and a child's mobile phone 400, as an example of the present invention.

Here, the dad's mobile phone 200, the mom's mobile phone 300 and the child's mobile phone 400 may receive 6:30 a.m. user recognition information, 6 a.m. user recognition information and 8 a.m. recognition information, respectively. Then the electronic device controllers (i.e., the first and second electronic device controllers 230 and 330) of the respective dad's mobile phone, the mom's mobile phone and the child's mobile phone output the respective user recognition information to the display apparatus 100 through the electronic device network units (i.e., the first and second electronic device network units 290 and 390). Then, the display apparatus controller 135 determines the IDs of the electronic devices 200, 300 and 400 which have transmitted the user recognition information input through the display apparatus network unit 190. When it is determined that the IDs conform to that prestored in the memory 180, the respective user recognition information is stored in the memory 180. When it is 6 a.m., the display apparatus controller 135 controls at least one of the interface picture generator 137 and the signal processor 131 to output the user recognition signal to the output unit 150. That is, the display apparatus controller 135 controls the respective units to display a message "Mom, time to wake up" as shown in FIG. 2, or controls the audio signal to be output. Alternatively, various alert sounds may be output.

Also, the display apparatus controller 135 may control at least one of the interface picture generator 137 and the signal processor 131 to output the user recognition signals informing that the current time reaches the time corresponding to the time data at 6:30 a.m., i.e., a message "Dad, time to wake up" and a message "child, time to wake up" at 8:00 a.m. Alternatively, the information which informs that the current time reaches the time corresponding to the time data, may be variously realized by an alert sound, a user recognition sound and/or an LED.

Schedule information on "class reunion at 18:00" may be input to the mom's mobile phone 300. Here, the time data comprises "18:00" and the schedule content, i.e., the schedule data comprises the "class reunion".

The display apparatus 100 may receive the schedule information on "class reunion at 18:00". When it is 18:00, the display apparatus controller 135 may control at least one of the interface picture generator 137 and the signal processor 131 to output a picture including information "Mom, time for class reunion" informing that the current time reaches the time corresponding to the time data to the display 155 or output a sound to the speaker 151. Alternatively, the information informing that the current time reaches the time corresponding to the time data may be variously realized by an alert sound, a user recognition sound and an LED flickering.

At this time, the user recognition information may further comprise time data to inform a user of the time for the class reunion one hour before the class reunion. Then, the display apparatus controller 135 may control at least one of the interface picture generator 137 and the signal processor 131 to output a picture including a message stating "17:00, one hour before Mom's class reunion" to the display apparatus 100 or to output a sound to the speaker 151. Alternatively, the information may be output as various sounds and/or an LED flickering.

In the display apparatus 100, the user recognition signal is output to the display 155 and the speaker 151 only when power is turned on. When the display apparatus 100 is in a standby power mode in which a microcomputer detecting whether power is turned on/off receives power even when power is turned off, power is supplied to a unit which determines whether the current time reaches the time corresponding to the time data of the user recognition information, thereby determining whether the current time reaches the time corresponding to the time data. Then, in the display apparatus 100, power is supplied to the respective units of the display apparatus 100 or supplied to the signal processor 131, the output unit 150 and the interface picture generator 137 when the current time reaches the time corresponding to the time data of the user recognition information, thereby outputting the user recognition signal to the output unit 150.

FIG. 3 is a control flowchart of the display apparatus according to an exemplary embodiment of the present invention.

When the user recognition information is input through the first and second electronic device user selection units 270 and 370 of the electronic devices 200 and 300, the first and second electronic device controllers 230 and 330 output the user recognition information through the first and second electronic device network units 290 and 390. Hereinafter, the user recognition information comprises "class reunion at 6 p.m." which is input to the mom's mobile phone 300, as an example of the present invention. Here, the time data comprises "6 p.m." and the schedule data comprises the "class reunion".

The display apparatus 100 may comprise an on-timer function. Here, the on-timer function comprises a function which outputs the user recognition information supplied from the electronic devices 200 and 300 to the output unit 150 and informs a user of the user recognition information. Here, the on-timer function is additionally provided so that a user selects whether to set the on-timer function. Alternatively, the display apparatus 100 may be set to have the on-timer function all the time.

When the on-timer function is set (S11), the display apparatus 100 may control the interface picture generator 137 to generate the interface picture including the setting menu which sets the ID of the electronic devices 200 and 300 transmitting the user recognition information. Then, the display 155 of the display apparatus 100 displays the interface picture including the setting menu (S13). When the ID of the electronic devices 200 and 300 is input through the interface picture including the setting menu (S15), the display apparatus controller 135 stores the input ID of the electronic devices 200 and 300 in the memory 180 (S17). When the user recognition information including the time data is received through the display apparatus network unit 190 of the display apparatus 100 (S19), the display apparatus controller 135 analyzes the ID of the electronic devices 200 and 300 which have transmitted the user recognition information, and determines whether the ID is identical to that stored in the memory 180 (S21). The display apparatus controller 135 stores the user recognition information output from the electronic devices 200 and 300 including the identical ID with each other in the memory 180. When the current time reaches the time corresponding to the time data included in the user recognition information (S23), the display apparatus controller 135 outputs the user recognition signal informing that the current time reaches the time corresponding to the time data (S25). That is, the display apparatus controller 135 may control at least one of the interface picture generator 137 and the signal processor 131 to output the user recognition signal including information that class reunion is scheduled at 6 p.m. for Mom, to the output unit 150.

As described above, even when the user recognition information is supplied from a mobile phone of the child's friend after the IDs of the dad's mobile phone, the mom's mobile phone and the child's mobile phone are set, the display apparatus 100 does not store the user recognition information transmitted from the mobile phone of the child's friend in the memory 180, and accordingly does not output the user recognition signal based on the mobile phone of the child's friend, to the output unit 150.

In the display system according to the exemplary embodiment of the present invention, when a user stores the user recognition information in the electronic devices 200 and 300 such as his/her mobile phone or electronic clock, the user recognition information is transmitted to the display apparatus 100. Accordingly, even if a user does not inform another user of his/her user recognition information or does not store it in the display apparatus 100, another user may recognize the user recognition information through the display apparatus 100 frequently used by the user and inform the user of it. Also, a user may recognize his/her user recognition information as the display apparatus 100 informs a user of it.

In the foregoing exemplary embodiments, the display apparatus is provided as an example of the present invention, but not limited thereto. Alternatively, the present invention may be applicable for an information processing apparatus which processes an input signal, e.g., a set-top box, a DVD player and a mobile phone.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An information processing apparatus comprising:
a network unit which receives user recognition information including time data from an external device;
a processor which receives the user recognition information from the network unit and outputs a user recognition signal corresponding to the time data included in the user recognition information if a current time reaches a time corresponding to the time data; and
an output unit which outputs a signal based on the user recognition signal,
wherein the output unit comprises at least one of a display which displays an image corresponding to the user recognition signal and a speaker which outputs a sound corresponding to the user recognition signal, and
wherein the processor comprises:
an interface picture generator which generates an interface picture; and
a controller which controls the interface picture generator to generate the interface picture including a setting menu to set an identifier (ID) of the external device receiving the user recognition information, and controls the user recognition signal corresponding to the user recognition information received from the external device having the ID set through the setting menu, to be output to the output unit.

2. The information processing apparatus according to claim 1, wherein
the controller controls the interface picture generator to generate the interface picture including an indication that the current time reaches a time corresponding to the time data if the current time reaches the time corresponding to the time data.

3. The information processing apparatus according to claim 2, wherein the user recognition information comprises at least one of wake-up call information and schedule information including schedule data, and
wherein the processor outputs the user recognition signal including information indicating that the current time reaches the time corresponding to the time data if the wake-up call information is received, to the output unit, and outputs the user recognition signal including information indicating that the current time reaches the time corresponding to the time data and the schedule data included in the schedule information to the output unit if the schedule information is received.

4. The information processing apparatus according to claim 3, wherein the processor outputs the user recognition signal to the output unit at one of the time corresponding to the time data and a time before the time corresponding to the time data.

5. An information processing apparatus system comprising:
an electronic device; and
an information processing apparatus,
wherein the electronic device comprises:
an electronic device network unit;
an electronic device user selection unit which selects user recognition information including time data; and
an electronic device controller which controls the electronic device network unit to output the selected user recognition information, and
wherein the information processing apparatus comprises:
a network unit which receives the user recognition information including the time data from the electronic device;
a processor which receives the user recognition information from the network unit and outputs a user recognition signal corresponding to the time data if a current time reaches a time corresponding to the time data; and
an output unit which receives the user recognition signal and outputs a signal based on the user recognition signal,
wherein the output unit comprises at least one of a display which displays an image corresponding to the user recognition signal and a speaker which outputs a sound corresponding to the user recognition signal, and
wherein the processor comprises:
an interface picture generator which generates an interface picture; and
a controller which controls the interface picture generator to generate the interface picture including a setting menu to set an identifier (ID) of the external device receiving the user recognition information, and controls the user recognition signal corresponding to the user recognition information received from the external device having the ID set through the setting menu, to be output to the output unit.

6. The system according to claim 5, wherein the controller controls the interface picture generator to generate the interface picture including an indication that the current time reaches the time corresponding to the time data if the current time reaches the time corresponding to the time data.

7. The system according to claim 6, wherein the user recognition information comprises at least one of wake-up call information and schedule information including schedule data, and
wherein the processor outputs the user recognition signal including information indicating that the current time reaches the time corresponding to the time data if the wake-up call information is received, to the output unit, and outputs the user recognition signal including information indicating that that the current time reaches the time corresponding to the time data and the schedule data included in the schedule information to the output unit if the schedule information is received.

8. The system according to claim 7, wherein the processor outputs the user recognition signal to the output unit at one of the time corresponding to the time data and a time before the time corresponding to the time data.

9. A method of controlling an information processing apparatus, the method comprising:
receiving, by the information processing apparatus, user recognition information including time data from an external device; and outputting, by the information processing apparatus, a user recognition signal corresponding to the time data if a current time reaches a time corresponding to the time data, wherein the outputting the user recognition signal comprises at least one of displaying an image corresponding to the user recognition signal and outputting an audio signal corresponding to the user recognition signal, and wherein the outputting the user recognition signal further comprises:

generating an interface picture including a setting menu to set an identifier (ID) of the external device receiving the user recognition information, and controlling the user recognition signal corresponding to the user recognition information received from the external device having the ID set through the setting menu, to be output.

10. The method according to claim 9, wherein the generating the interface picture comprises:

generating the interface picture including an indication that the current time reaches the time corresponding to the time data, if the current time reaches the time corresponding to the time data; and displaying the interface picture.

11. The method according to claim 10 further comprising:

storing the ID of the external device which is set through the setting menu.

12. The method according to claim 11, wherein the outputting the user recognition signal comprises:

determining the ID of the external device; and outputting the user recognition signal if the ID of the external device is identical to that set through the setting menu.

* * * * *